Sept. 15, 1959          C. L. COOK          2,904,165
CENTER STRAP FOR POTATO DIGGER CHAIN
Filed March 26, 1957
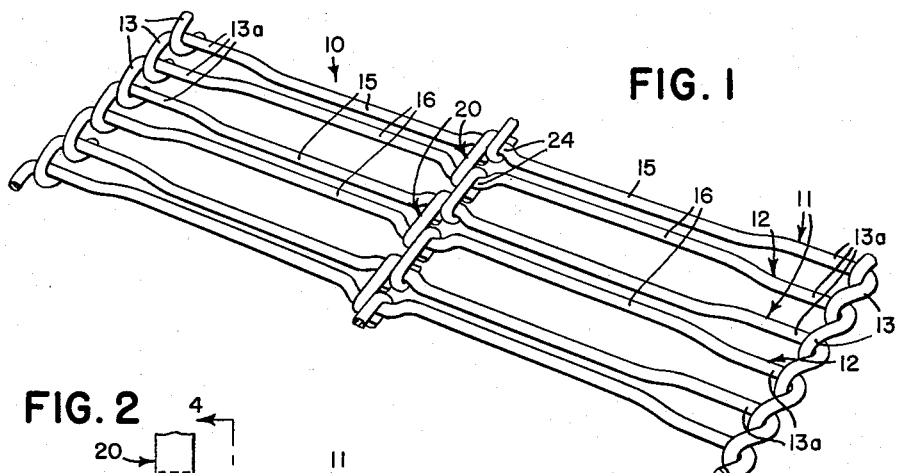
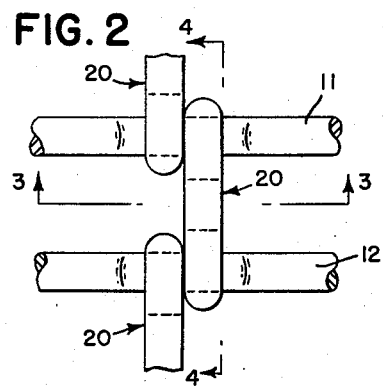
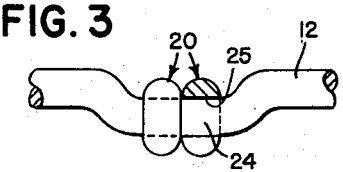
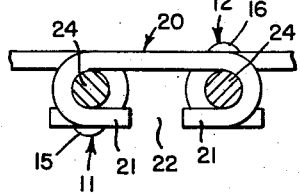
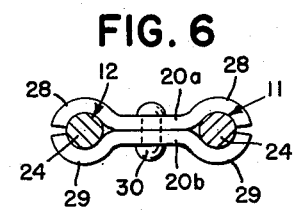
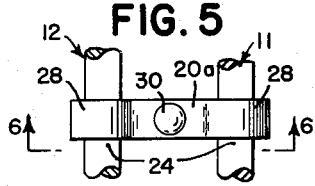
*INVENTOR.*
CURTISS L. COOK
BY
ATTORNEYS

United States Patent Office 2,904,165
Patented Sept. 15, 1959

2,904,165

CENTER STRAP FOR POTATO DIGGER CHAIN

Curtiss L. Cook, Syracuse, N.Y., assignor, by mesne assignments, to Deere & Company, a corporation of Delaware Application March 26, 1957, Serial No. 648,561

5 Claims. (Cl. 198—193)

The present invention relates generally to agricultural implements and more particularly to potato diggers, and is especially concerned with elevators, commonly employed in potato diggers and constructed of a plurality of chain links constructed and arranged to elevate the dug potatoes and sift clods and the like therefrom. The conventional potato digger chain consists of a series of transverse generally parallel rods bent at their ends to from hooks thereon, and the hooks at the ends of each rod engage the adjacent portions of the next adjacent rod to provide an endless chain.

The object and general nature of the present invention is the provision of a new and improved potato elevator chain that can be made appreciably wider, such that, for example, two rows of potatoes may be dug at the same time. Experience has shown that the use of wider than normal potato chain elevators encounters certain difficulties due to deflection and/or bending of the central portion of the elevators' links, and when this occurs stones are apt to pass through the upper flight and drop down onto the lower or returning flight and carried forward thereby to cause trouble at the front of the digger. Also, potatoes of a marketable size are frequently lost or damaged by virtue of the undesired deflection or bending of the generally central portions of the links or rods making up the elevator. According to my invention, I provide means to interconnect the generally central portions of the links so as to prevent such undesired deflection and/or bending, thereby providing a new and improved potato chain elevator which is especially adapted for operations under stony conditions.

More specifically, this invention contemplates the provision of a new and improved potato chain elevator having adjacent central portions of the transverse links interconnected by relatively short link-like straps that entirely eliminate the above-mentioned undesirable deflection and bending. Preferably, these center links or straps are so made that they may be installed after the potato chain itself has been assembled, and when the installation of the center links or straps is complete, the relationship of the elevator links will be maintained at the desired spacing and undesirable bending and deflection will be eliminated.

Still further, it is a feature of this invention to provide a wide type of potato chain elevator in which the transverse links thereof are offset centrally to provide link-receiving means having laterally facing abutments, with center links interconnecting adjacent transverse links, the center links being held against lateral displacement along the associated transverse links by virtue of shoulders formed at the central offset portions of the transverse links. Still further, the offset central portions of the links are so interrelated with the conventionally offset ends that the central offset portions are aligned with the link-engaging hook sections whereby the pivoting action of one transverse link relative to the other is in no way inhibited by the center links which keep the central portions of the transverse links from deflecting.

These and other objects and advantages of the present invention will be apparent to those skilled in the art after a consideration of the following detailed description of the preferred means in which the principles of this invention have been incorporated.

In the accompanying drawings in which the preferred means has been shown by way of illustration:

Fig. 1 is a perspective view of a plurality of interconnected links of a potato chain elevator.

Fig. 2 is an enlarged fragmentary view of several center links and associated portions of the elevator links.

Fig. 3 is a sectional view taken generally along the line 3—3 of Fig. 2.

Fig. 4 is a sectional view taken generally along the line 4—4 of Fig. 2.

Fig. 5 is a view somewhat similar to Fig. 2, showing a modified form of this invention.

Fig. 6 is a section taken generally along the line 6—6 of Fig. 5.

Referring first to Fig. 1, the potato chain elevator is indicated in its entirety by the reference numeral 10 and is made up of a plurality of transverse links 11 and 12. Each of the links 11 and 12 is provided with end sections 13 that are formed generally as hooks that interconnect with and engage over the adjacent portions 13a of the associated transverse links. The portions 13a are aligned with one another and taken together form an axis about which one link may pivot relative to the adjacent link.

The chain links 11 and 12 are formed with offset sections intermediate the end portions 13a. The transverse links 11 have downwardly offset portions, as indicated at 15, while the adjacent links 12 have upwardly offset portions 16. These upwardly and downwardly offset portions are provided to increase the load-carrying capacity of the elevator and, in effect, form pockets that hold the potatoes in place during elevation thereof and prevent them from rolling down the upwardly moving upper flight of the elevator 10.

As mentioned above, where the width of the elevator 10 is increased a tendency arises for the links 11 and 12 to deflect or bend generally at their central portions, with the result that stones and sometimes even potatoes fall down through the upper flight and being caught by the lower flight are carried forwardly and interfere with the proper operation of the elevator. According to this invention, I provide a plurality of center links, each of which is indicated by the reference numeral 20 and preferably is in the form of a generally U-shaped strap that, as best shown in Fig. 4, includes ends 21 bent to engage over the adjacent transverse links, with a space 22 between the bent ends to accommodate bringing the center links 20 into position after the chain links 11 and 12 have been assembled in interconnected relation by engaging the hook sections 13 thereof with the adjacent portions of the associated links.

In order to receive the center interconnecting links 20, each of the transverse links 11 and 12 is provided with a central offset section indicated by the reference numeral 24. These offset sections 24 are so formed that they are disposed in line with the end sections 13a, which form the axes of link interconnection as mentioned above. That is to say, the portions 24 of the transverse links 11 are offset upwardly, as shown in Fig. 1, relative to the link portions 15, and the offset portions 24 of the other links 12 are offset downwardly relative to the link portions 16. Thus, the pitch dimensions of the portions of the transverse links that are interconnected by the center links of the straps 20 are substantially identical with the pitch dimensions of the portions 13a that are interconnected by the hook ends 13. In order to provide for adequate resistance against wearing, the interconnecting links are flat at the inner portion, as indicated at 25 in Fig. 3. The offset portions 24 form shoulders that, as mentioned above, hold the center links against lateral displacement along the transverse links, thus holding the center links in position.

A modified form of this invention is shown in Figs. 5 and 6 in which, instead of having one piece, as is the case of the center links 20, the center links of 5 and 6 are made of two pieces 20a and 20b. These links or strap members are, like the members 20, provided with spaced end sections 28 and 29 that are spaced apart and can be assembled about the links 11 and 12 after the latter are interconnected. In the form of the invention shown in Figs. 5 and 6, the parts 20a and 20b are held in interconnected relation by a fastener 30, which may be a rivet, bolt or the like.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a potato digger or the like, a wide type link elevator including a plurality of generally transverse links interconnected at their ends and normally spaced apart at their central portions, means on the center portion of each transverse link forming spaced apart shoulders, and a center link interconnected with each pair of adjacent links between the associated shoulders thereon so as to prevent the central parts of the transverse links from being deflected away from one another.

2. In a potato digger or the like, a wide type link elevator including a plurality of generally transverse links interconnected at their ends, said ends being disposed in alignment and the intermediate portion of each link being offset from the axis of said ends, the generally central part of each intermediate portion being offset to an extent sufficient to bring said central part into alignment with said ends, and a center link interconnected with the central parts of each pair of adjacent links to prevent the central parts of the transverse links from being deflected away from one another.

3. The invention set forth in claim 2, further characterized by the offset intermediate portions of said transverse links presenting shoulders disposed on opposite sides of the associated center links to prevent lateral displacement thereof relative to the transverse links.

4. In a potato digger or the like, a wide type link elevator including a plurality of generally transverse links interconnected at their ends, a pair of laterally inwardly facing spaced apart abutments on each of said transverse links in the generally central portion thereof and a plurality of center links interconnected with said transverse links between the associated spaced apart abutments so as to prevent the central parts of the transverse links from being deflected away from one another, each center link having end portions engaging two adjacent transverse links and said two adjacent transverse links being engaged, respectively, by the end portions of two associated center links, the end portions of said two associated center links overlapping the end portions of the associated center link in generally parallel relation.

5. The invention set forth in claim 4, further characterized by the end portions of each center link having link-engaging sections lying in a generally cylindrical surface.

References Cited in the file of this patent

UNITED STATES PATENTS

| | | |
|---|---|---|
| 908,773 | Hunt | Jan. 5, 1909 |
| 2,703,644 | Van Lake | Mar. 8, 1955 |